US012775463B2

(12) United States Patent
Gupta et al.

(10) Patent No.: US 12,775,463 B2
(45) Date of Patent: Oct. 27, 2026

(54) HIERARCHICAL STORE QUEUE CIRCUIT

(71) Applicant: Apple Inc., Cupertino, CA (US)

(72) Inventors: Nikhil Gupta, Santa Clara, CA (US); Gideon N. Levinsky, Cedar Park, TX (US); Kulin N. Kothari, Cupertino, CA (US); Mridul Agarwal, Saratoga, CA (US); Pankaj Lnu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/175,328

(22) Filed: Apr. 10, 2025

(65) Prior Publication Data

US 2025/0291737 A1 Sep. 18, 2025

Related U.S. Application Data

(63) Continuation of application No. 18/359,755, filed on Jul. 26, 2023, now Pat. No. 12,298,915.

(51) Int. Cl.
*G06F 9/30* (2018.01)

(52) U.S. Cl.
CPC ................................ *G06F 9/30043* (2013.01)

(58) Field of Classification Search
None
See application file for complete search history.

(56) References Cited

U.S. PATENT DOCUMENTS

| | | | | |
|---|---|---|---|---|
| 5,621,896 | A * | 4/1997 | Burgess | G06F 9/384 712/E9.046 |
| 12,298,915 | B1 * | 5/2025 | Gupta | G06F 9/30043 |
| 2019/0108032 | A1 * | 4/2019 | Gonzalez | G06F 9/3851 |

OTHER PUBLICATIONS

U.S. Appl. No. 18/359,755, filed Jul. 26, 2023.

* cited by examiner

*Primary Examiner* — Nathan Sadler
(74) *Attorney, Agent, or Firm* — Kowert, Hood, Munyon, Rankin & Goetzel, P.C.; Scott W. Pape; Dean M. Munyon

(57) ABSTRACT

An apparatus includes a cache memory circuit, and a hierarchal store queue circuit that further includes a primary queue and a secondary queue. The hierarchal store queue circuit may be configured to write incoming store requests to the primary queue in response to the primary queue currently having capacity, and to write incoming store requests to the secondary queue in response to the primary queue currently not having capacity. The hierarchal store queue circuit may be further configured to commit store requests to the cache memory circuit from the primary queue but not from the secondary queue. In response to a determination that the primary queue currently has capacity, the hierarchal store queue circuit may perform a transfer of at least one store request from the secondary queue to the primary queue.

20 Claims, 10 Drawing Sheets

System 100

*Store-to-Load Forwarding Senarios*
Table 500

| case | primary queue 110 | secondary queue 120 | cache memory circuit 130 | action |
|---|---|---|---|---|
| 501 | full hit | miss | X | store-to-load forwarding from primary queue |
| 502 | partial hit | miss | miss | wait for cache line fill (replay load request in primary queue) |
| 503 | partial hit | miss | hit | store-to-load forwarding from primary queue and merge with cache line data |
| 504 | X | full hit (single match) | X | store-to-load forwarding from secondary queue |
| 505 | miss | partial hit (single match) | hit | store-to-load forwarding from secondary queue and merge with cache line data |
| 506 | partial or no hit | partial hit | miss | wait for cache line fill (replay load request in primary and secondary queues) |
| | combined partial hit | | | |
| 507 | partial hit | partial hit | X | store-to-load forwarding from primary and secondary queue |
| | combined full hit | | | |
| 508 | X | multi-match | X | store-to-load forwarding from secondary queue across multiple replays of load request |

FIG. 5A

*Store-to-Load Forwarding Stages*
Table 555

| load pipe cycles | | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| first-pass STLF | IS | RR | AT | DT | DD | FW | P1 | P2 | | | | | | | | | |
| | | | | | | | | *Allocate SAS entry* | | | | | | | | | |
| second-pass STLF | | | | | | | | RP | RP1 | RP2 | IS | RR | AT | DT | DD | FW | FW1 |
| | | | | | | | | | | | *Deallocate SAS entry* | | | | | | |
| SAS valid | *nv* | *nv* | *nv* | *nv* | *nv* | *nv* | *nv* | *V* | *V* | *V* | *V* | *nv* | *nv* | *nv* | *nv* | *nv* | *nv* |

700

HIERARCHICAL STORE QUEUE CIRCUIT

The present application is a continuation of U.S. application Ser. No. 18/359,755, entitled "Hierarchical Store Queue Circuit," filed Jul. 26, 2023, the disclosure of which is incorporated by reference herein in its entirety.

BACKGROUND

Technical Field

Embodiments described herein are related to computing systems, including systems-on-a-chip (SoCs). More particularly, embodiments are disclosed to techniques for managing memory request queues on an SoC.

Description of the Related Art

A processor core may employ a load-store unit to issue load and store requests to lower levels of memory. For example, a core may use a load-store unit to issue a load request to fetch cached information and to issue a store request to update values of currently cached data. Load requests may be time sensitive since subsequent instructions being processed by the core may use one or more values from a load request as operands. In some cases, load requests may include memory locations for the subsequent instructions themselves. Until the requested information is retrieved, processing of subsequent instructions may stall. Store requests, however, may not be time sensitive since the core has a current copy of the data being stored. A store request may update a corresponding memory location to a value produced by the core such that the updated value may be accessed at a later point in time when the core no longer holds a local copy.

Accordingly, load-store units may utilize store queues to buffer store requests that have been executed by the processor but are either awaiting retirement so they can commit to the cache, or have been retired and are awaiting an opportunity to update the cache that doesn't impact load requests. Typically, the store requests are committed to the cache in program order to avoid the appearance that they occurred out of order from a third-party observer (e.g., another processor core). Since store requests are generally not critical to performance, it may be desirable to make the store queue larger in subsequent integrated circuit designs. However, die area, timing, and power constraints may restrict a size of a store queue.

BRIEF DESCRIPTION OF THE DRAWINGS

The following detailed description makes reference to the accompanying drawings, which are now briefly described.

FIG. 5A shows a table depicting a plurality of scenarios for performing a store-to-load forwarding operation in a hierarchal store queue circuit.

Figure 1:
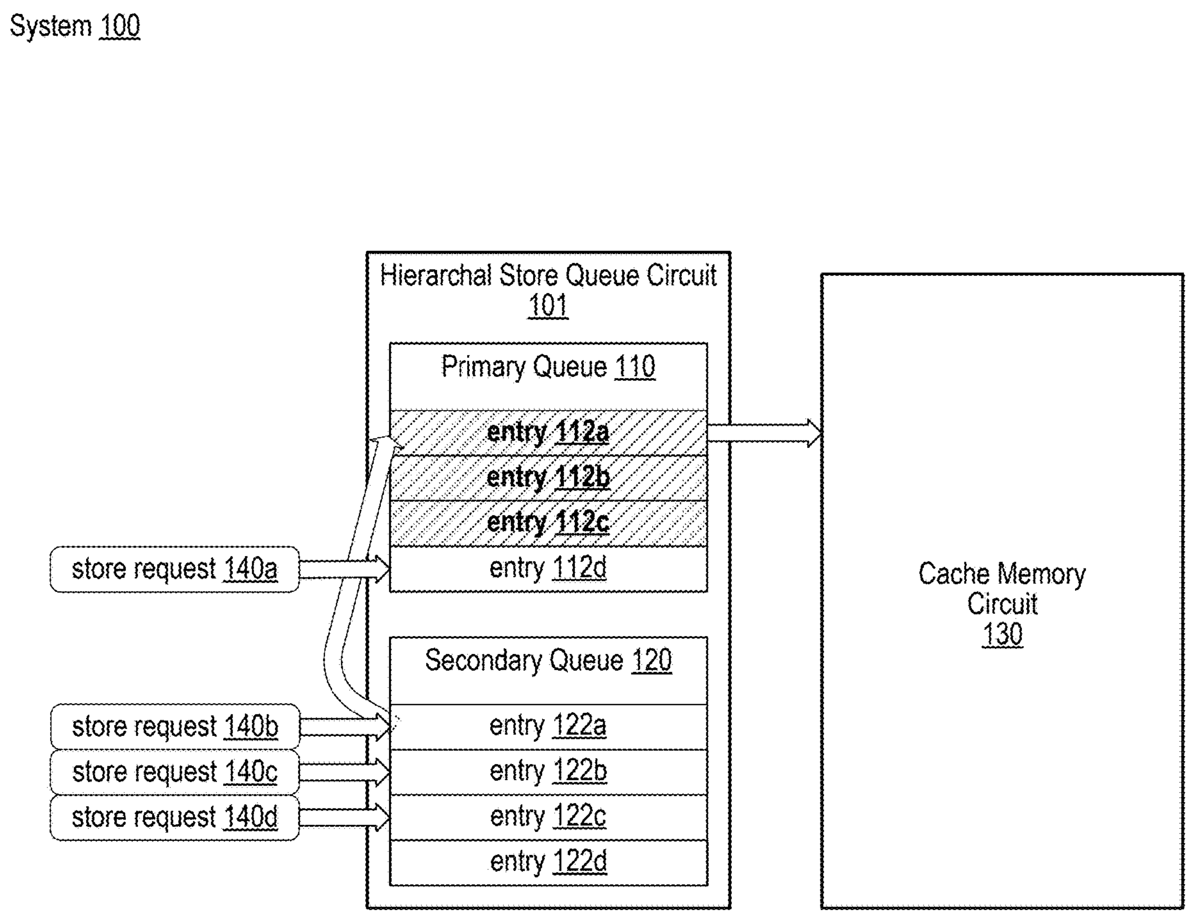
FIG. 1 illustrates a block diagram of an embodiment of an system that includes a hierarchal store queue circuit and a cache memory circuit.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF EMBODIMENTS

As described above, designers may want to increase a size of a store queue in a new integrated circuit design, such as a new system-on-chip (SoC). Increasing a size of a store queue, however, may have undesirable impacts on die area, clock signal timing, and power consumption. For example, doubling a size of a store queue may more than double die area for the store queue due to support circuitry and other considerations. As an example of support circuitry, a store queue may, in response to a load request, be searched for a preceding store that will update the values of locations corresponding to the load requests. Such a search is referred to herein as "store-to-load forwarding." In store-to-load forwarding, the most up-to-date data may need to be forwarded from a store request in the store queue to allow the load request to complete with the correct data. Circuitry to perform such searches becomes more complex as a size of the store queue increases.

Techniques and apparatuses are proposed herein that allow for increased store queue sizes while reducing the negative impacts disclosed above. A hierarchal store queue structure is proposed that includes a fast (primary) store queue and a store overflow (secondary) queue. The primary queue is used to queue the oldest store requests, detect/perform store-to-load forwarding, and complete/retire store requests with a cache memory circuit. When the primary queue becomes full, younger store requests are placed into the secondary queue and wait to be moved to the primary queue at a later time after older store requests have been committed to the cache memory circuit and removed from the primary queue. The secondary queue may not handle store-to-load forwarding as quickly as the primary queue (e.g., simpler circuits may be used in the secondary queue), and store requests are not committed to the cache memory circuit from the secondary queue. Instead, store requests in the secondary queue are transferred into the primary queue to be processed. It is noted that older store requests may be more likely to be hit on by older load requests. Accordingly, rapid store-to-load forwarding may be more essential to these older load requests, as completing older load requests may have more performance benefit than completing younger load requests. Using the primary store queue for older requests, therefore, allows the secondary store queue to utilize simpler circuitry, thereby reducing the disclosed negative impacts while increasing a size of the store queue.

FIG. 1 illustrates a block diagram of an embodiment of a system that uses hierarchal store queue circuit to buffer memory store requests prior to completion. System 100 includes hierarchal store queue circuit 101 and cache memory circuit 130. Hierarchal store queue circuit 101 includes primary queue 110 and secondary queue 120, each with a respective plurality of entries. Primary queue 110 includes entries 112*a*-112*d* while secondary queue includes entries 122*a*-122*d* (collectively 112 and 122, respectively). Hierarchical store queue circuit 101 receives store requests 140*a*-140*d* (collectively 140) that are placed in available ones of entries 112 and 122. In some embodiments, system 100 may be a part of an integrated circuit, such as an SoC, which may further be included in a computing system, such as a desktop or laptop computer, a smartphone, a tablet computer, a wearable smart device, or the like.

As illustrated, system 100 includes cache memory circuit 130 that is configured to cache information from memory locations in a system memory, such as a dynamic random-access memory (DRAM), solid-state hard drive, universal serial bus (USB) thumb drive, flash card memory, and the like. cache memory circuit 130 may provide quicker access to cached information for one or more processor circuits that may be coupled to cache memory circuit 130. When information at a given memory address is fetched for use by such a processor, the information may be read using a load request and then the fetched information stored in one or more cache lines in cache memory circuit 130. If a value of this information is modified by the processor, then a store request may be issued to write the modified value back to the memory address. In addition to modifying the value stored in the target memory address, cached copies of the target memory address are also modified to maintain coherency in cache memory circuit 130.

System 100 further includes hierarchal store queue circuit 101 that includes primary queue 110 and secondary queue 120. Hierarchal store queue circuit 101, as shown, is configured to receive issued store requests 140 (e.g., from the processor, not shown) and buffer these requests until they have completed processing in cache memory circuit 130 and can be retired. Each of store requests 140 includes an indication of at least one memory address and respective values to be written to one or more locations at the indicated address(es). Hierarchical store queue circuit 101 receives store requests 140 because each of store requests 140 include at least one memory address that hits in cache memory circuit 130.

To buffer received store requests 140, hierarchal store queue circuit 101, as illustrated, is configured to write a particular incoming store requests 140 to primary queue 110 in response to primary queue 110 currently having capacity within entries 112. As depicted, entries 112*a*-112*c* are unavailable when store request 140*a* is received. Entry 112*d*, however, is available, and store request 140*a* may be placed in this entry. Entry 112*d* is filled with suitable details from store request 140*a* to identify the one or more memory locations that are cached in cache memory circuit 130 that will be updated with the new values include in store request 140*a*. Furthermore, additional information may be included in entry 112*d*, such as status information as well as placement within an order for entries to be processed and/or a timestamp, and the like.

As shown, hierarchal store queue circuit 101 is further configured to write incoming store requests 140 to secondary queue 120 in response to primary queue 110 currently not having capacity. For example, after store request 140*a* is placed into entry 112*d*, all of entries 112 may be in use and primary queue 110 may, therefore, be full. If there are no available entries 112 in primary queue 110, then hierarchal store queue circuit 101 places subsequently received store requests 140 into respective entries 122 of secondary queue 120. Store requests 140*b*-140*d* are received after store request 140*a* is placed into entry 112*d*, filling primary queue 110. As depicted, store requests 140*b*-140*d* are placed into entries 122*a*-122*c*, respectively. As described for entry 112*d*, entries 122*a*-122*c* may also be filled with suitable details from respective store request 140*b*-140*d* to allow these requests to be processed at a later point in time.

Hierarchal store queue circuit 101 is further configured, as illustrated, to commit store requests 140 to cache memory circuit 130 from primary queue 110, but not from secondary queue 120. Any store requests placed into secondary queue 120, e.g., store requests 140*b*-140*d*, must be transferred to primary queue 110 in order to be processed and committed. When resources of cache memory circuit 130 are available to receive a store request, hierarchal store queue circuit 101 may identify the oldest store request currently buffered in primary queue 110 and proceed to process the request by writing corresponding values from the identified store request to a cache line or lines that are associated with the one or more memory addresses identified in the store request. After the associated cache lines are updated with the new values the identified store request may be committed. Committing the store request from primary queue 110 frees space in primary queue 110. For example, when store request 140*a* is committed, entry 112*d* is freed for receiving a different store request.

In response to a determination that primary queue 110 currently has capacity and secondary queue 120 currently includes one or more store requests 140, hierarchal store queue circuit 101 may perform a transfer of at least one of store requests 140 from secondary queue 120 to primary queue 110 such that, after the transfer, a youngest store request in primary queue 110 is older than an oldest of any store requests remaining in secondary queue 120. For example, when cache memory circuit 130 has resources available to process a store request from primary queue 110, an oldest store request in primary queue 110 may be held in entry 112*a*, while store request 140*a* in entry 112*d* is the youngest. The store request from entry 112*a* may then be processed by storing the relevant values from the store request into corresponding cache lines of cache memory circuit 130, and then committed, thereby making entry 112*a* available for use. Store request 140*b* in entry 122*a* may be an oldest store request currently held in secondary queue 120 and therefore, may be transferred to entry 112*a* in primary queue 110, making store request 140*b* the youngest store request in primary queue 110, yet still older than any of the store requests remaining in secondary queue 120.

By committing store requests from primary queue 110 and not from secondary queue 120, control circuitry for managing entries 122 of secondary queue 120 may be simpler than the corresponding control circuitry for managing entries 112 of primary queue 110. This simpler control circuitry may, therefore, be smaller and consume less power than the control circuitry for primary queue 110. Accordingly, more entries 122 may be added to secondary queue 120 in a given IC design as compared to adding entries 112 to primary queue 110. Furthermore, maintaining the oldest store requests in primary queue 110 may allow for older, and therefore possibly more critical, load requests to be serviced either from cache memory circuit 130 or directly from primary queue 110 if a corresponding store request has not been committed. As will be described in further detail below, load request may also be serviced from uncommitted store requests held in secondary queue 120. Servicing load requests from secondary queue 120, however, may be slower due to the reduced size and capabilities of secondary queue 120.

It is noted that system 100, as illustrated in FIG. 1, is merely an example. System 100 has been simplified to highlight features relevant to this disclosure. Elements not used to describe the details of the disclosed concepts have been omitted. For example, system 100 may include various additional circuits that are not illustrated, such as one or more processor circuits, clock management circuits, communication buses, and the like. Although only four entries are shown for each of primary queue 110 and secondary queue 120, any suitable number of entries may be included in each queue. Additionally, a number of entries in secondary queue 120 may differ from a number of entries in primary queue 110, being either more or fewer. In various embodiments, hierarchal store queue circuit 101 and cache memory circuit 130, as well as other circuits of system 100, may be implemented using any suitable combination of sequential and combinatorial logic circuits. In addition, register and/or memory circuits, such as static random-access memory (SRAM) may be used in these circuits (e.g., to implement primary and secondary queues 110 and 120 and/or cache lines in cache memory circuit 130) to temporarily hold information such as store and load request, and/or additional information associated with management and processing of the requests.

In FIG. 1, a system for receiving and queuing store requests, in a hierarchal store queue circuit, is shown. As disclosed above, load requests may also be generated within such a system and the hierarchal store queue circuit be accessed to identify a queued store request corresponding to a generated load request. An example of a hierarchal store queue circuit capable of receiving and servicing particular load requests is depicted in FIG. 2.

Figure 2:
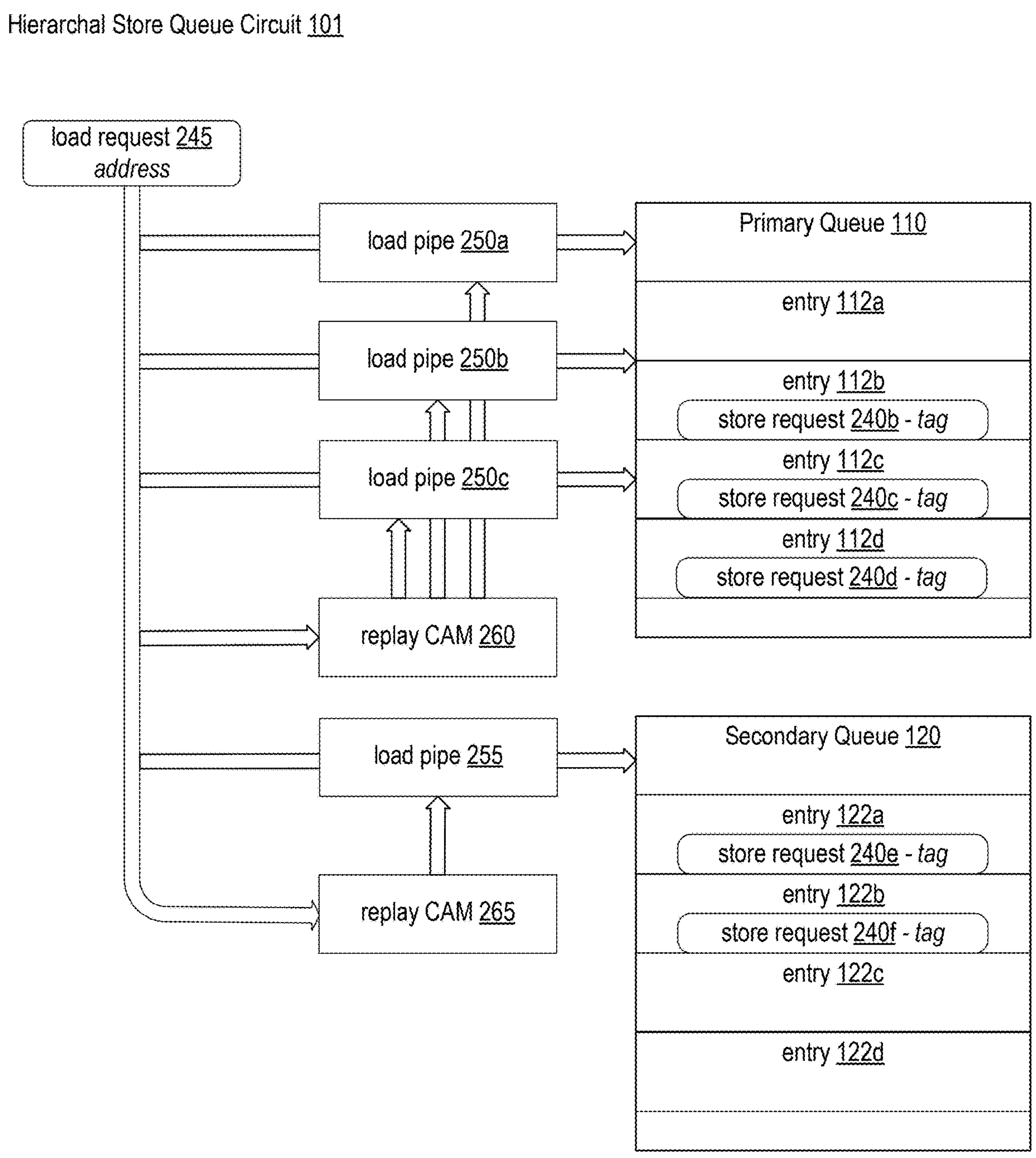
FIG. 2 shows a block diagram of an embodiment of the hierarchal store queue circuit of FIG. 1 that includes a plurality of load pipes, a primary queue, and a secondary queue.

Moving to FIG. 2, a block diagram of an embodiment of a hierarchal store queue circuit with multiple load pipes is shown. Hierarchal store queue circuit 101 is depicted with primary queue 110 and secondary queue 120 as described above in regards to FIG. 1. In addition, hierarchal store queue circuit 101 further includes load-pipe circuits (load pipes) 250*a*-250*c* (collectively 250) that are coupled to primary queue 110. Hierarchal store queue circuit 101 also includes load-pipe circuit (load pipe) 255 coupled to secondary queue 120. Furthermore, replay content-addressable memory (CAM) 260 is coupled to load-pipe circuits 250 while replay CAM 265 is coupled to load-pipe circuit 255. Hierarchal store queue circuit 101 is illustrated as receiving load request 245 that includes a particular memory address from which one or more values are to be read.

As illustrated, hierarchal store queue circuit 101 may, in response to an indication of load request 245 for cache memory circuit 130 of FIG. 1, determine whether load request 245 corresponds to a store request currently held in hierarchal store queue circuit 101, including, e.g., any one or more of store requests 240*b*-240*f* (collectively 240). Load request 245, or an indication thereof, may be sent to hierarchal store queue circuit 101 to determine if any of store requests 240 correspond to the address of load request 245, and therefore, may hold a most current value for information stored at the address.

To determine whether a given load request corresponds to one or more store requests currently held in primary queue 110, hierarchal store queue circuit 101 is configured to concurrently identify a plurality of store requests currently stored in primary queue 110 for a plurality of load requests. As illustrated, primary queue 110 includes primary-queue load-pipe circuits 250. Load-pipe circuits 250 may each be loaded with a respective one of the plurality of load requests to search primary queue 110 for a matching store request. To determine whether load request 245 corresponds to one or more of store requests 240, hierarchal store queue circuit 101 is configured to use one or more of load-pipe circuits 250 to identify whether one of store requests 240*b*-240*d* currently stored in primary queue 110 corresponds to load request 245. If additional load requests are being processed while load request 245 is being processed, then each load request is concurrently processed by a respective one of load-pipe circuits 250.

Load-pipe circuits 250 may include circuits to perform one or more different search techniques. For example, each of load-pipe circuits 250 may be capable of using an address hash, a byte mask, or a straight index of the address of load request 245 in order to identify whether one of store requests 240*b*-240*d* corresponds to the same address. In other embodiments, each of load-pipe circuits 250 may utilize a different one of these techniques. The multiple load-pipe circuits 250, combined with the plurality of search techniques, may provide search results in an acceptably efficient number of system clock cycles. For example, in some embodiments, a typical store-to-load forwarding operation in primary queue 110 may take four clock cycles to complete, thereby providing a faster response to the load request as compared to retrieving the information from the cache memory circuit 130.

To determine whether load request 245 corresponds to one or more of store requests 240*e* or 240*f* currently held in secondary queue 120, hierarchal store queue circuit 101 is further configured to identify at most a single store request currently stored in the secondary queue for a single load request. In contrast to primary queue 110, secondary queue 120 includes a single load-pipe circuit 255. Accordingly, hierarchal store queue circuit 101 may use load-pipe circuit 255 to process only load request 245 to identify whether a store request currently stored in the secondary queue corresponds to the load request.

Also, in contrast to primary queue 110, load-pipe circuit 255 may support only a single technique for performing the search, such as indexing through the held store requests based on the address of the load request. Accordingly, a latency to forward data from primary queue 110 to a load request may be less than a latency to forward data from secondary queue 120 to a load request. For example, in some embodiments, a typical store-to-load forwarding operation may take eleven clock cycles to complete in secondary queue 120.

The difference in store-to-load forwarding latencies, however, may result in larger, more complex load-pipe circuits for primary queue 110 than for secondary queue 120. Since primary queue 110 holds older store requests than secondary queue 120, and since older store requests are more likely to be hit by older load requests, the reduced latency from primary queue 110 may be worth the size and power increases while the longer latency from secondary queue 120 may be acceptable to avoid incurring an increased size and power penalty.

It is noted that the example shown in FIG. 2 is one depiction of a hierarchal store queue circuit. In other embodiments, any suitable number of queues and corresponding load-pipe circuits may be included. Only four entries are shown for each of primary queue 110 and secondary queue 120. Any suitable number of entries may be included for each queue in other embodiments.

In the descriptions of FIGS. 1 and 2, techniques for managing, by a hierarchal store queue circuit, store requests and load requests are disclosed. Queues may be implemented in a variety of fashions. Details for an example implementation of a hierarchal store queue circuit are shown in FIG. 3.

Figure 3:
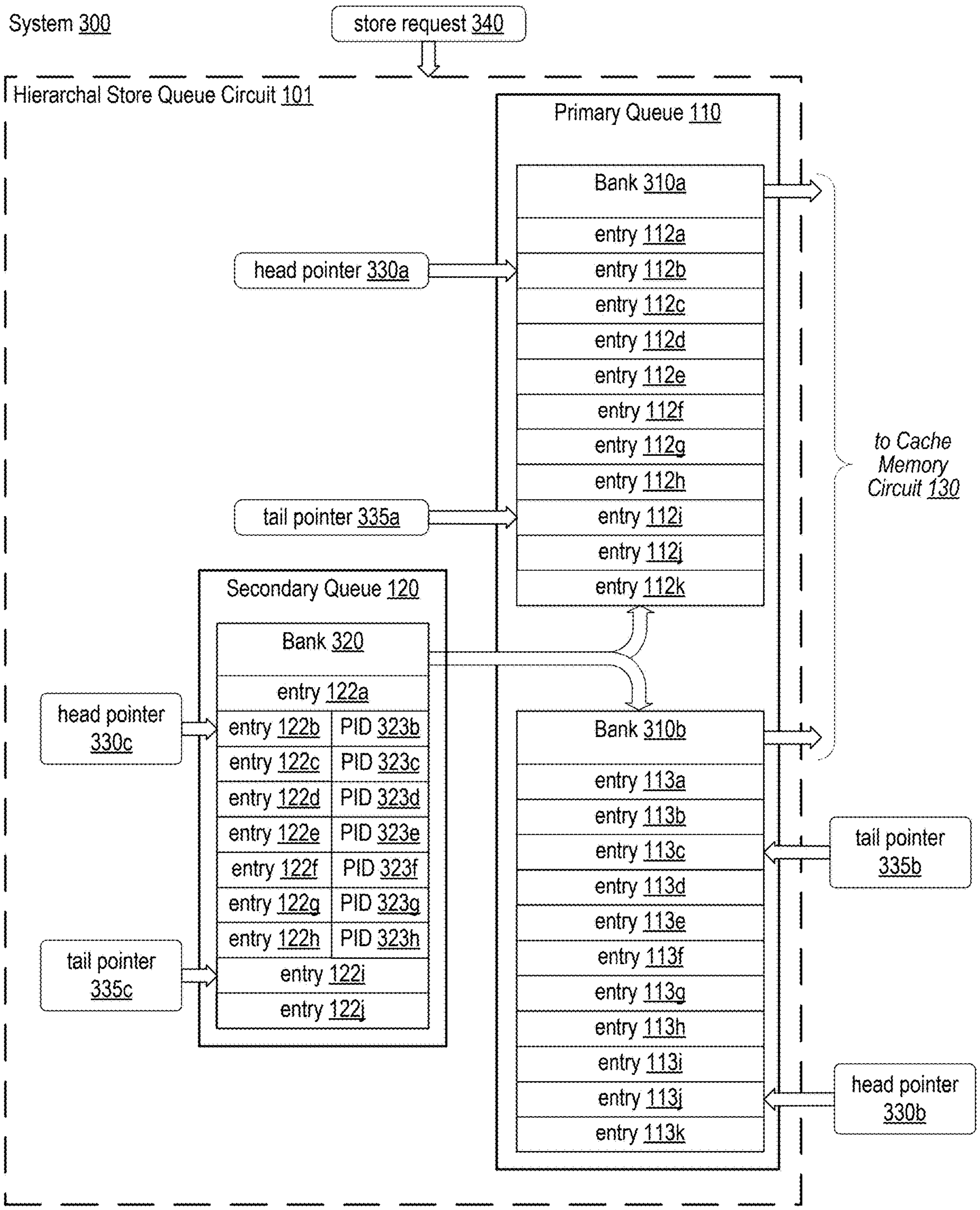
FIG. 3 depicts a block diagram of an embodiment of a system that includes a hierarchal store queue circuit with a primary queue including two memory banks, and a secondary queue including a single memory bank.

Turning to FIG. 3, a block diagram of another embodiment of a system with a hierarchal store queue circuit is shown. As shown in FIGS. 1 and 2, hierarchal store queue circuit 101 includes primary queue 110 and secondary queue 120, as described above. Secondary queue 120 includes a single memory circuit bank 320 with entries 122*a*-122*j*. Primary queue 110 includes two banks of memory circuits, bank 310*a* with entries 112*a*-112*k*, and bank 310*b* with entries 113*a*-113*k*. A respective one of head pointers 330*a*-330*c* indicates an oldest entry in a corresponding one of banks 310*a*, 310*b*, and 320. Similarly, a respective one of tail pointers 335*a*-335*c* indicates a next available entry in a corresponding one of banks 310*a*, 310*b*, and 320.

As illustrated, system 300 operates in a similar manner as system 100 in FIG. 1. Hierarchal store queue circuit 101 is configured to receive store request 340 for writing one or more values to cache memory circuit 130. Store request 340 is placed into hierarchal store queue circuit 101 to be buffered until any store requests issued before store request 340 is completed and retired. To place store request 340 into hierarchal store queue circuit 101, available ones of entries 112 and 113 in banks 310*a* and 310*b* in primary queue 110 are identified. In some embodiments, banks 310*a* and 310*b* may be independent from one another such that one may be accessed concurrently with the other. This concurrency may, therefore, allow two store requests, or one store request and one or more load requests, to be processed concurrently.

In some embodiments, primary queue 110 may be implemented as one or more circular queues. As shown, each of banks 310*a* and 310*b* can be maintained as independent queues with respective ones of head pointers 330*a* and 330*b*, and respective ones of tail pointers 335*a* and 335*b*. Head pointers 330 indicate which occupied entry in a respective queue is at the top of the queue. For example, head pointer 330*a* indicates that a store request in entry 112*b* is the top of primary queue 110 in bank 310*a*. Similarly, head pointer 330*b* indicates that a store request in entry 113*j* is the top of primary queue 110 in bank 310*b*. Store requests may be placed in primary queue 110 based on age. The top of the queue, therefore, holds the oldest store request in that queue. As illustrated, tail pointers 335 indicate which unoccupied entry in a respective queue is the next available entry in the queue. E.g., tail pointer 335*a* indicates that entry 112*i* is the next entry in bank 310*a* to be used while tail pointer 335*b* indicates the same for entry 113*c*.

Referring to bank 310*b*, it is noted that since bank 310*b* is implemented as a circular queue (as are banks 310*a* and 320), tail pointer 335*b* has wrapped around the entries 113 and now points to entry 113*c* which at one point in time would have been at the head of bank 310*b*. If a tail pointer 335*b* circles completely around and points to a same entry 113 as corresponding head pointer 330*b*, then bank 310*b* is full and cannot accept further store requests until one or more currently held store requests are retired.

In response to determining that primary queue 110 does not currently have sufficient available entries for holding store request 340, available ones of entries 122 in bank 320 in secondary queue 120 are identified. Like banks 310*a* and 310*b*, bank 320 in secondary queue 120 is implemented as a circular queue. Store requests may be placed in secondary queue 120 based on age, such that head pointer 330*c* indicates the oldest occupied entry 122 while tail pointer 335*c* indicates the next available entry 122.

In response to determining that secondary queue 120 currently has sufficient available entries 122 for holding store request 340, hierarchal store queue circuit 101 may place store request 340 at the entry indicated by tail pointer 335*c* (e.g., entry 122*i*) in secondary queue 120. As shown, hierarchal store queue circuit 101 adds a respective primary queue entry identifier, e.g., PID 323*b*-323*h* (collectively 323), to entries 122 in which a particular store request is placed. The PID 323 may be used to help maintain a program order of the store requests being queued. In some embodiments, hierarchal store queue circuit 101 may, when placing store request 340 in secondary queue 120, determine a particular entry in one of banks 310*a* and 310*b* in which to place store request 340 when store request is eventually transferred into primary queue 110. This determination may be based on, for example, an instruction identification number (IDN) assigned to store request 340 in an instruction buffer or load-store unit in which store request 340 was processed prior to being issued to hierarchal store queue circuit 101. Each store request held in primary queue 110 and secondary queue 120 may include a respective IDN that may be used to help track the oldest store request in the queues, thereby helping to maintain program order for retiring store requests after cache memory circuit 130 has been updated per the retired store requests.

In some embodiments, received store requests may be balanced between banks 310*a* and 310*b*, such that if two entries 112 are filled in bank 310*a*, two entries 113 in bank 310*b* must be filled prior to filling another entry 112 in bank 310*a*. In other embodiments, banks 310*a* and 310*b* may be treated as a single circular buffer, such that no entries 113 are filled until a last entry 112 (e.g., 112*k*) is filled. PIDs 323 may be assigned in a manner that is consistent with operation of banks 310*a* and 310*b*.

As resources in cache memory circuit 130 are available, hierarchal store queue circuit 101 may commit received store requests to cache memory circuit 130 from primary queue 110, but not from secondary queue 120. As previously disclosed, committing store requests from primary queue 110 frees entries 112 and/or 113 in primary queue 110. An oldest store request in banks 310*a* and 310*b*, as determined by their respective IDNs, for example, may be identified by head pointers 330*a* and 330*b* and then completed and retired.

In response to a determination that primary queue 110 currently has sufficient available entries for holding an oldest store request in secondary queue 120 (e.g., as determined by head pointer 330*c*), hierarchal store queue circuit 101 may transfer the oldest store request in secondary queue 120 to primary queue 110. To transfer the oldest store request to primary queue 110, hierarchal store queue circuit 101 may be configured to determine whether the available entries in primary queue 110 correspond to a correct placement, in primary queue 110. For example, PID 323*b* may correspond to the oldest store request in secondary queue 120, and may indicate entry 112*i* in bank 310*a*. Accordingly, relocating the oldest store request from secondary queue 120 to primary queue 110 may include determining whether an entry indicated by tail pointer 335*a* matches entry 112*i* as indicated by PID 323*b*. In the illustrated example, they match and the store request held in entry 122*b* may be transferred to entry 112*i* in bank 310*a*.

In normal operation, hierarchal store queue circuit 101 may manage the entries in primary queue 110 and secondary queue 120 such that tail pointers 335 are in sync with head pointer 330*c*. As store requests in primary queue 110 are retired in program order, store request in secondary queue 120 may seamlessly be transferred into the vacated entries of primary queue 110. Under some circumstances, however, retirement of store requests in primary queue 110 may occasionally occur out of order, or a store request in primary queue 110 may be killed due to a subsequent store request to a same memory address. In these occasional cases, hierarchal store queue circuit may be capable of reestablishing the proper order by holding store requests in secondary queue 120 until the entry indicated by the respective PID 323 is available.

It is noted that the system depicted in FIG. 3 is merely an example to demonstrate the disclosed concepts. Although the tail pointer is described as pointing to a next available entry in a given queue, in other embodiments, the tail pointer may instead indicate a last occupied entry in the queue. As shown, banks 310*a* and 310*b* each include eleven entries, while bank 320 includes ten entries. These numbers of entries are just for demonstrative purpose, and each of banks 310*a*, 310*b*, and 320 may include any suitable number of entries.

FIGS. 1-3 describe hierarchal store queue circuits for buffering store requests until the queued store requests can be processed and completed. Various processor cores may include different sets of stages within a load-store pipeline through which load and store requests are processed. One example of a load-store pipeline is depicted in FIG. 4.

Figure 4:
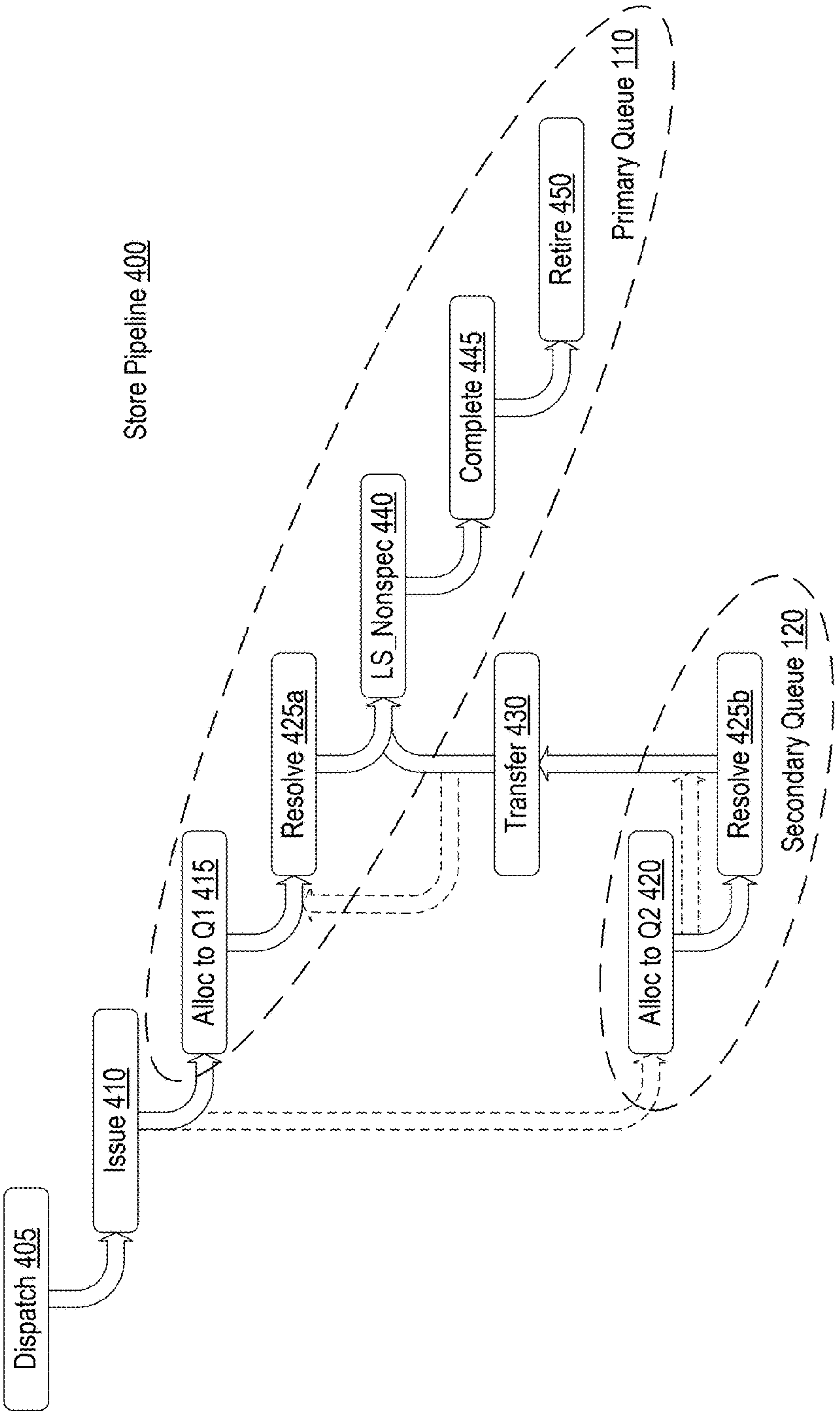
FIG. 4 illustrates a block diagram of an embodiment of a store pipeline associated with a hierarchal store queue circuit.

Proceeding to FIG. 4, an example of an instruction pipeline for performing store requests is illustrated. Store pipeline 400 includes seven stages for a main flow using primary queue 110 and three additional stages for an alternate flow using secondary queue 120 in addition to primary queue 110. As shown, store pipeline 400 begins with dispatch stage 405 and further includes issue stage 410, allocate to primary queue (alloc to Q1) 415, resolve stage 425*a*, load-store (LS) nonspec stage 440, complete stage 445, and retire stage 450. The three additional stages for use with secondary queue 120 are allocate to secondary queue (alloc to Q2) 420, resolve stage 425*b*, and transfer stage 430.

With reference to system 100 in FIG. 1, store pipeline 400 begins in dispatch stage 405 when a given store request (e.g., store request 140*a*) is generated and sent to a load-store reservation station to be assigned to a particular load-store unit. Store request 140*a* may remain in the load-store reservation station until a load-store unit has available resources to receive store request 140*a* at issue stage 410. In the issue stage, the load-store reservation station may, in some embodiments, also identify a particular load-store unit in which to issue store request 140*a*. For example, at some levels of a memory hierarchy, a plurality of cache memory circuits may be available and a particular one of the cache memory circuits may currently have a cache line allocated to an address indicated by store request 140*a*.

In some embodiments, hierarchal store queue circuit 101 may be included in the load-store unit and having available resources includes having an adequate number of available entries in primary queue 110 and/or secondary queue 120. When these resources are available, store request 140*a* issues to the assigned load-store unit and is then allocated to either primary queue 110 or secondary queue 120. If primary queue 110 has sufficient entries available, then allocate to primary queue 415 is performed and store request 140*a* remains queued until resources in the load-store unit are available to perform resolve 425*a*, in which virtual addresses included in store requests 140*a* may be translated to physical addresses, thereby allowing a particular cache line in cache memory circuit to be identified that corresponds to the address included in store request 140*a*.

In load-store nonspec stage 440, one or more write commands may be generated to perform store request 140*a*. For example, store request 140*a* may be a partial write request that addresses two or more non-sequential memory locations. In such a case, a respective write command may be generated for each non-sequential memory location. These one or more write commands may be executed, and store request 140*a* may then be moved to complete stage 445 to await a confirmation that the executed write commands have executed successfully. If the commands are not executed successfully, then store request 140*a* may be placed in a replay circuit and moved back into load-store nonspec stage 440. After receiving an acknowledgement that the commands executed successfully, store request 140*a* enters retire stage 450. If store request 140*a* was executed out-of-order (e.g., was executed before a different instruction that came before store request 140*a* in program order) then store request 140*a* may remain in retire stage 450 until all instructions coming before store request 140*a* in program order have been successfully completed and retired. At this point, store request 140*a* may be successfully retired.

If, at issue stage 410, primary queue 110 does not have sufficient available entries to receive a store request (e.g., store request 140*b*) then the load-store unit may allocate store request 140*b* to one or more available entries in secondary queue 120 at allocate to secondary queue 420. Hierarchal store queue circuit 101 is configured to resolve an oldest store request in secondary queue 120 prior to transferring the oldest store request to primary queue 110. If resources and time are sufficient, store request 140*b* may enter resolve stage 425*b* to convert a virtual address in store request 140*b* to a corresponding physical address.

After sufficient entries in primary queue 110 are available, store request 140*b* enters transfer stage 430. In some cases, time and or resources may not be available to complete resolve stage 425*b* before store request 140*b* enters transfer stage 430. If store request 140*b* completes resolve stage 425*b*, then store request 140*b* is transferred to primary queue 110 in load-store nonspec stage 440 to be executed as one or more write commands. Otherwise, if resolve stage 425*b* does not complete, then store request 140*b* is transferred to primary queue 110 in resolve stage 425*a* to complete translation of one or more virtual addresses into corresponding physical addresses. Store request 140*b* proceeds through the stages in primary queue 110 as described above.

It is noted that the pipeline flow of FIG. 4 is merely an example. In other embodiments, a different number of stages may be included in the pipeline. In some embodiments, one or more of the illustrated stages may be replaced by, or combined with, other pipeline stages. For example, in some embodiments, the load-store nonspec stage 440 and complete stage 445 may be combined into a single stage in which write commands are performed and wait for acknowledgements.

In FIG. 2, store-to-load forwarding was described as a technique for fulfilling a load request when a store request, that hits on a same address as the load request, is queued in a hierarchal store queue circuit. Both store and load requests may target a range of memory locations, and therefore, a plurality of scenarios exist regarding the load request hitting one or more of the primary queue, secondary queue, and cache memory circuit. Examples of actions taken in response to different scenarios are disclosed in FIG. 5A.

Moving now to FIG. 5A, a table is shown that maps particular actions in response to a load request hitting various ones of a primary queue, a secondary queue, and a cache memory circuit. Table 500 includes eight different scenarios, cases 501-508, indicating how an address in a load request may hit on addresses in an entry of primary queue 110, in an entry of secondary queue 120, and/or in a cache line of cache memory circuit 130. For each of cases 501-508, a respective action is described. Elements of FIGS. 1 and 2 are referenced in the description of table 500.

A load request may identify one or more memory locations from which stored information is requested. If one or more of the identified memory locations corresponds to a prior store request that has not been retired, then the correct values for these corresponding locations may only be available in the store requests until the store requests are retired. Accordingly, when a load request is received by a circuit, e.g., a load-store unit, that includes a hierarchal store queue circuit and a cache memory circuit, the correct values for fulfilling this load request may be included in a store request queued in the primary queue, the secondary queue, in one or more cache lines in the cache memory circuit, or in a combination thereof. One option for fulfilling a load request is to queue the load request (e.g., in a replay buffer) until any older store requests that hold values corresponding to the load request have retired. While such a technique may improve a likelihood of fulfilling the load request with the correct values, the amount of time spent waiting for the store requests to be retired may have a negative impact to performance of a processor circuit waiting for the requested values.

As illustrated, multiple scenarios may be encountered in which performance may be improved by fulfilling a load request using data from one or more queued store requests, using a store-to-load forwarding technique as described above. Table 500 includes one column indicating a case number, from 501-508, identifying a given scenario, three columns providing indications for whether values associated with a given load request are included in primary queue 110, secondary queue 120, and cache memory circuit 130. A final column describes one or more actions that may be taken to fulfill the load request in the corresponding case. The indications for whether values associated with a given load request are included in a corresponding queue or cache include "full hit," "partial hit," "miss," and "X." A "full hit" indicates that all values for fulfilling the load request are included in the corresponding queue/cache. A "partial hit" indicates that some, but not all, values for fulfilling the load request are included in the corresponding queue/cache. A "miss" means that no values are included in the corresponding queue/cache. An "X" indicates a "don't care" in which case whether values for fulfilling the load request are included in the corresponding queue/cache is irrelevant.

In case 501, primary queue 110 includes one or more store requests that contain all values for a given load request, and secondary queue 120 contains no store requests with any values. Since store requests in primary queue 110 have newer values for the respective memory locations than associated cache lines in cache memory circuit 130, inclusion of any values in cache memory circuit 130 for the given load request is irrelevant. In case 501, a store-to-load forwarding operation is performed using corresponding store requests buffered in primary queue 110.

In case 502, only some values for a given load request are included in primary queue 110, while neither secondary queue 120 nor cache memory circuit 130 have any of the corresponding values. In case 502, the given load request may wait until the corresponding cache line is filled. For example, the given load request may be replayed in a replay circuit in primary queue 110.

All values for a given load request hit in cache memory circuit 130 in case 503. Primary queue 110, however, includes a portion of values for the given load request. Since values in primary queue 110 are newer than those in cache memory circuit 130, the load request is fulfilled by retrieving values from cache memory circuit 130, performing a store-to-load forward in primary queue 110, and using the portion of values from primary queue 110 to replace corresponding values retrieved from cache memory circuit 130.

Secondary queue 120 includes a single store request that contains all values for a given load request in case 504. Since secondary queue 120 may include the youngest store requests that have been issued, it is irrelevant if either primary queue 110 and/or cache memory circuit 130 includes any values associated with the given load request. A store-to-load forwarding operation is performed using the single store request buffered in secondary queue 120.

In case 505, no values are included in primary queue 110, a portion of values are included in a single store request in secondary queue 120, and all values are included in cache memory circuit 130. In a similar manner as case 503, values in secondary queue 120 are newer than those in cache memory circuit 130. Accordingly, the load request is fulfilled by retrieving values from cache memory circuit 130, performing a store-to-load forward in secondary queue 120, and using the portion of values from secondary queue 120 to replace corresponding values retrieved from cache memory circuit 130.

In case 506, no values are cached in cache memory circuit 130 while primary queue 110 and secondary queue 120 may combine to include a portion of the values. In case 506, the given load request may be replayed in corresponding replay circuits in both primary queue 110 and secondary queue 120 until the corresponding cache line is filled.

Case 507 depicts a scenario in which primary queue 110 and secondary queue 120 combine to include all values for a given load request. To fulfill the load request, respective store-to-load forwarding operations are performed in both primary queue 110 and secondary queue 120.

In scenario 508, all values for a given load requests are included across a plurality of queued store requests in secondary queue 120, e.g., no single store request includes all of the newest values. As shown in FIG. 2, secondary queue 120 may include only a single load-pipe circuit 255, and therefore, only be capable of performing a single store-to-load forwarding operation at a given time. Accordingly, a series of store-to-load forwarding operations are performed in secondary queue 120 to fulfill the load request, one operation for each of the plurality of store requests.

It is noted that the scenarios depicted in FIG. 5A are merely examples for describing the disclosed techniques. In other embodiments, a different number of cases may be applicable, each with a respective action or actions. In some embodiments, a plurality of cache memory circuits may be implemented at a same hierarchal level. In such embodiments, the described actions may be similar, but modified to incorporate values from the different cache memory circuits.

Figure 5B:
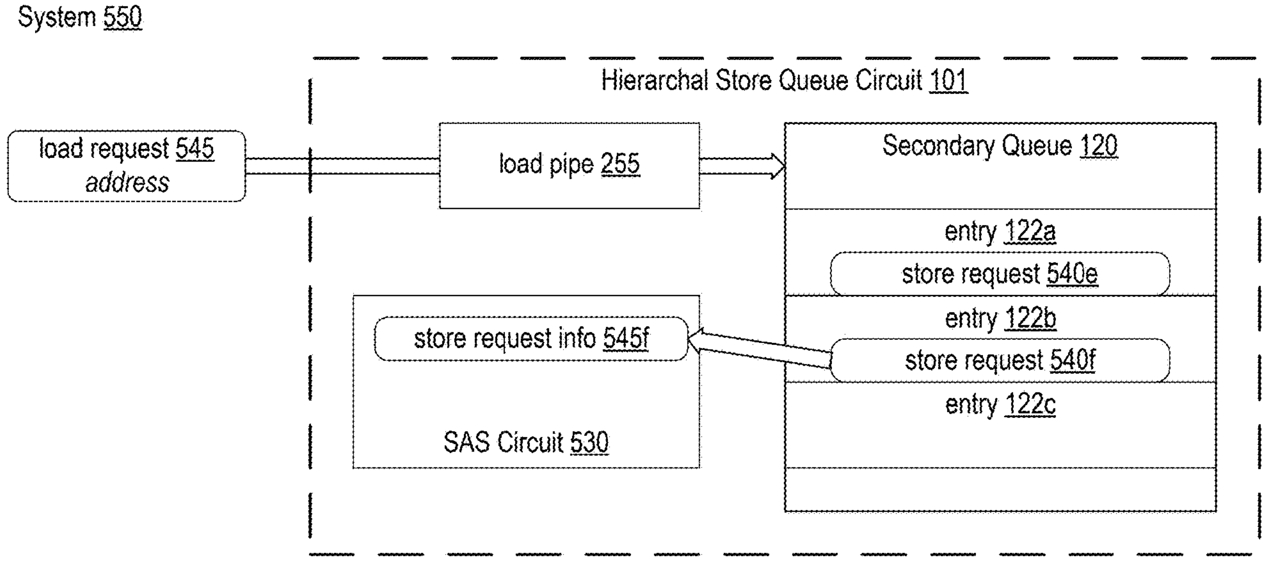
FIG. 5B illustrates a block diagram and table related to usage of a store-accumulate sidecar circuit for performing a store-to-load forwarding operation from a secondary queue.

FIG. 5A describes several scenarios in which a store-to-load forwarding operation is performed using a corresponding store request buffered in a secondary queue. A store-to-load forwarding operation may be performed in a variety of fashions. One such fashion is disclosed in regards to FIG. 5B.

Proceeding now to FIG. 5B, a system is illustrated in which a store-to-load forwarding operation is performed using a store-accumulate sidecar (SAS) circuit. System 550 includes hierarchal store queue circuit 101, which further includes secondary queue 120 from FIG. 1 and load pipe circuit 255 from FIG. 2. In system 550, SAS circuit 530 is used to buffer information related to a store request that is identified for use to fulfil a store-to-load forwarding operation.

As illustrated, hierarchal store queue circuit 101 receives an indication of load request 545 for information located at a particular address. In response to the indication of load request 545, hierarchal store queue circuit 101 may use load pipe circuit 255 to determine whether load request 545 corresponds to a store request currently held in secondary queue 120, including, e.g., either of store requests 540*e* and 540*f*. In a similar manner as described above in regards to FIG. 2, load request 545, or an indication thereof, may be sent to hierarchal store queue circuit 101 to determine if any currently held store requests correspond to the address of load request 545. Such a store request may hold a most current value for information stored at the address. As shown, the address of load request 545 corresponds to store request 540*f* in entry 122*b* of secondary queue 120.

In response to the determination, a store-to-load forwarding operation may be performed to use information included in store request 540*f* to fulfill load request 545. In a first pass of the store-to-load forwarding operation, store request information (info) 545*f* is placed in an entry in SAS circuit 530. SAS circuit 530 may include one or more entries to store information related to store requests in secondary queue 120. Store request information 545*f*, in some embodiments, may include data to be stored by store request 540*f* as well as information that identifies store request 540*f* within secondary queue 120 and links store request 540*f* to load request 545. Such information may include as at least a portion of the address and a tag or other value that identifies entry 122*b*. In the illustrated embodiment, store request information 545*f* may omit the data to be stored and include just the identification information. Omitting the data to be stored may allow entries in SAS circuit 530 to be smaller, thereby reducing circuit area and/or power consumption, and may reduce an amount of time for filling the entry of store request information 545*f*. In a second pass of the store-to-load forwarding operation, load request 545 may be replayed in load pipe circuit 255, causing SAS circuit 530 to provide store request information 545*f*, which in turn, is used to identify entry 122*b*. Entry 122*b* may then be accessed to copy data from store request 540*f* for use in fulfilling load request 545.

As shown, table 555 depicts stages of load pipe circuit 255 during the first and second passes of the store-to-load forwarding (STLF) operation. In the first pass of the store-to-load forwarding operation, load request 545 issues in load pipe circuit 255 and is processed through a sequence of stages until it plays in load pipe cycles 6 and 7. In cycle 7, store request 540*f* is identified as a hit for load request 545, an entry in SAS circuit 530 is allocated, and store request information 545*f* is copied from entry 122*b*. Starting in cycle 7, the entry in SAS circuit 530 is valid, and may not be used for store-to-load forwarding operations for other load requests. Load request 545 then replays in the second pass of the store-to-load forwarding (STLF) operation. As shown, load request 545 is in a replay queue (e.g., replay CAM 265 in FIG. 2) until cycle 10, during which load request 545 issues, thereby utilizing store request information 545*f* to identify entry 122*b*. Data from store request 540*f* is copied and used to fulfill load request 545. The entry in SAS circuit 530 is deallocated in cycle 10, and by cycle 11, is no longer valid and may be allocated to other load requests.

As stated, an allocated entry in SAS circuit 530 may not be used for other load requests. If a store-to-load forwarding operation for another load request also hits in secondary queue 120 while the allocated entry is valid, then a determination is made to identify the older of the two load requests. If the load request with the current allocation is older, then the subsequent load request may be placed in replay CAM 265 until the older load request is fulfilled. If, however, the subsequent load request is older than the load request with the allocated entry, then the load request with the allocation may be placed into replay CAM 265, the entry in SAS circuit 530 is deallocated and reallocated to the subsequent, older load request.

SAS circuit 530 may be utilized, as described, in scenarios 504-508 as shown in table 500 of FIG. 5A. In some embodiments, SAS circuit 530 may be used to identify two store requests corresponding to a load request being processed in scenario 508. For example, if the two store requests included in a multi-match in secondary queue 120 are in respective odd and even entries in secondary queue 120, then information from both entries may be copied into an allocated entry in SAS circuit 530.

It is noted that FIG. 5B is merely an example to illustrate disclosed techniques. Although a single entry is described for SAS circuit 530, any suitable number of entries may be included. In various embodiments, data for storage included in a hit store request may or may not be included in SAS circuit entries.

To summarize, various embodiments of an apparatus may include a cache memory circuit, and a hierarchal store queue circuit that further includes a primary queue and a secondary queue. The hierarchal store queue circuit may be configured to write incoming store requests to the primary queue in response to the primary queue currently having capacity, and to write incoming store requests to the secondary queue in response to the primary queue currently not having capacity. The hierarchal store queue circuit may be further configured to commit store requests to the cache memory circuit from the primary queue but not from the secondary queue. Committing store requests from the primary queue may free space in the primary queue. In response to a determination that the primary queue currently has capacity and the secondary queue currently includes one or more store requests, the hierarchal store queue circuit may also perform a transfer of at least one store request from the secondary queue to the primary queue. After such a transfer, a youngest store request in the primary queue may be older than an oldest of any store requests remaining in the secondary queue.

In a further example, a latency to forward data from the primary queue to a load request may be less than a latency to forward data from the secondary queue to a load request. In an example, the hierarchal store queue circuit may be further configured to, in response to an indication of a load request for the cache memory circuit, determine whether the load request corresponds to a store request currently held in the hierarchal store queue circuit.

In another example, the primary queue may comprise a plurality of primary-queue load-pipe circuits, and the secondary queue may comprise a secondary-queue load-pipe circuit. To determine whether the load request corresponds to a store request currently held in the hierarchal store queue circuit, the hierarchal store queue circuit may be configured to use one or more of the plurality of primary-queue load-pipe circuits to identify whether a store request currently stored in the primary queue corresponds to the load request, and to use the secondary-queue load-pipe circuit to identify whether a store request currently stored in the secondary queue corresponds to the load request.

In an example, the hierarchal store queue circuit may also be configured to concurrently identify a plurality of store requests currently stored in the primary queue for a plurality of load requests. The hierarchal store queue circuit may be configured, however, to identify at most a single store request currently stored in the secondary queue for a single load request.

In a further example, the primary queue may include a plurality of memory banks that may be accessed concurrently. The secondary queue may, however, include a single memory bank. In another example, the hierarchal store queue circuit may also be configured to resolve an oldest store request in the secondary queue prior to transferring the oldest store request to the primary queue.

The circuits and techniques described above in regards to FIGS. 1-5 may be performed using a variety of methods. Two methods associated with operation of a hierarchal store queue circuit are described below in regards to FIGS. 6 and 7.

Figure 6:
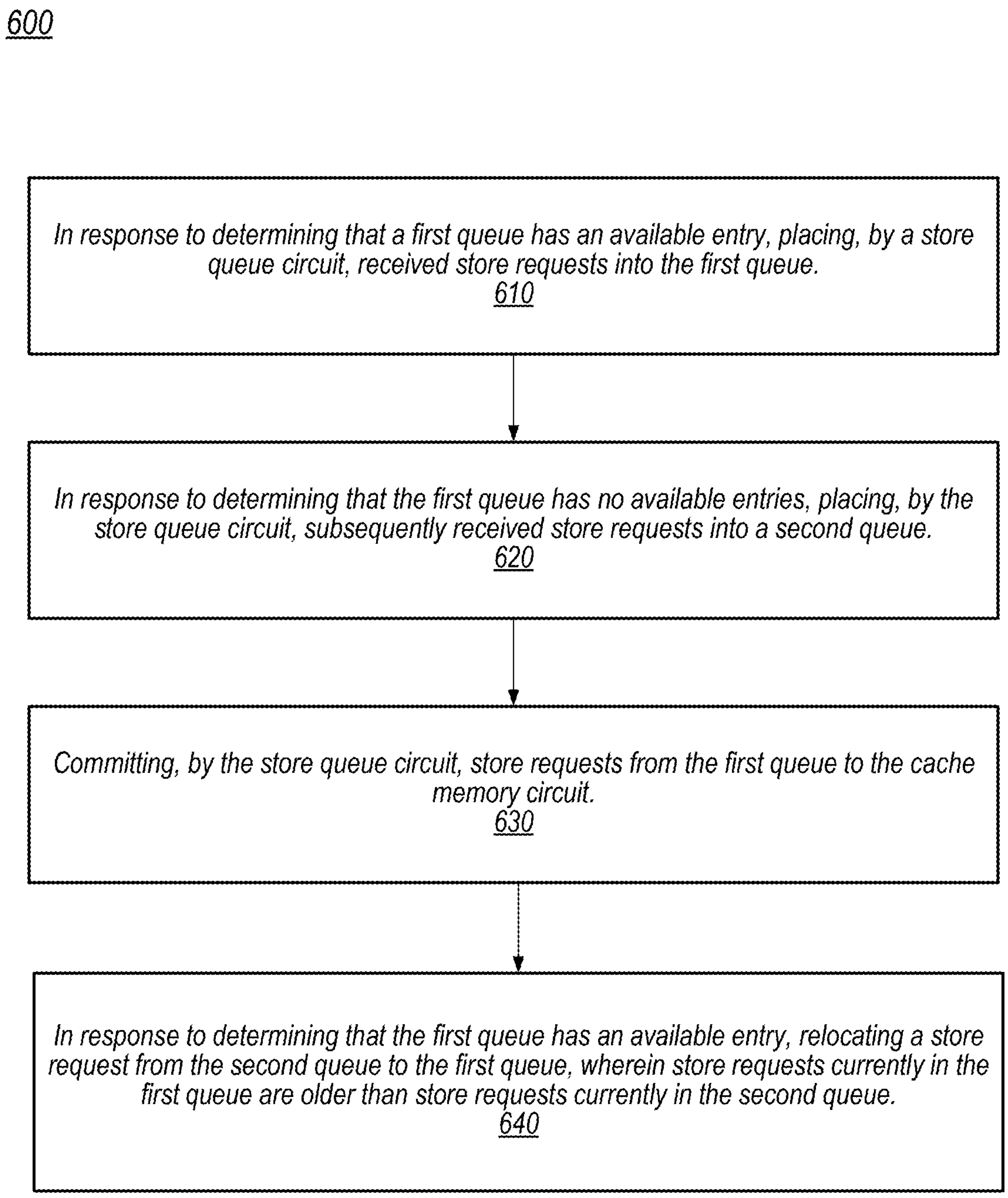
FIG. 6 depicts a flow diagram of an embodiment of a method for placing received store requests in a hierarchal store queue circuit.

Turning now to FIG. 6, a flow diagram for an embodiment of a method for placing store requests into a hierarchal store queue circuit is illustrated. Method 600 may be used in conjunction with any of the computer circuitry, systems, devices, elements, or components disclosed herein, such as systems 100 and 300 of FIGS. 1 and 3. In some embodiments, some or all of the operations of method 600 may be performed using instructions included in a non-transitory, computer-readable storage medium having program, the instructions being executable by a processing circuit in system 100 or 300 to cause the operations described with reference to FIG. 6. Method 600 is described below using system 100 of FIG. 1 as an example. References to elements in FIG. 1 are included as non-limiting examples.

As illustrated, method 600 begins in block 610 with a hierarchal store queue circuit, in response to determining that a primary queue has an available entry, placing received store requests into the primary queue. For example, hierarchal store queue circuit 101 may receive issued store requests 140 from a processor and buffer these requests until they have completed processing in cache memory circuit 130 and can be retired. The processor may send store requests 140 to hierarchical store queue circuit 101 in response to determining that each of store requests 140 include at least one memory address that hits in cache memory circuit 130. Buffering store request **140*a*, e.g., may include determining whether primary queue 110 has sufficient available entries 112 for storing store request 140*a*. A given one of entries 112 may include sufficient size for a particular number of bytes of information, such as sixteen bytes. If store request 140*a* includes sixteen bytes or less of information, then store request 140*a* may be placed into a single one of entries 112. Otherwise, additional ones of entries 112 may be needed to hold all necessary information of store request 140*a***.

Method 600 continues at block 620 with the hierarchal store queue circuit, in response to determining that the primary queue has no available entries, placing subsequently received store requests into a secondary queue. For example, after store request **140*a* is placed into primary queue 110, all of entries 112 may be in use and primary queue 110 may have an inadequate number of available entries 112 to hold a next store request, e.g., store request 140*b*. Hierarchal store queue circuit 101 may, therefore, place store request 140*b* into one or more available entries 122 of secondary queue 120. In some embodiments, placing store request 140*b* in secondary queue 120 may include adding, by hierarchal store queue circuit 101, a primary queue entry identifier to entry 122*a* into which store request 140*b* is placed. Store requests may be placed into entries 112 in program order. Accordingly, a particular one of entries 112 may be identified as a proper location for placing store request 140*b* in order to maintain the program order. If program order for store requests 140 is store request 140*a* followed by store request 140*b*, and store request 140*a* is placed into entry 112*d*, then entry 112*e* (not shown in FIG. 1) may be identified as the proper location in primary queue 110 for store request 140*b*. An indicator for entry 112*e* would, therefore, be included in entry 122*a* where store request 140*b*** is placed.

At block 630, method 600 continues with the hierarchal store queue circuit committing store requests from the primary queue to a cache memory circuit. As illustrated for the disclosed systems, hierarchal store queue circuit 101 commits store requests from primary queue 110, but not from secondary queue 120. Any store requests placed into secondary queue 120 are transferred to primary queue 110 prior to being processed and committed. Accordingly, store requests placed into secondary queue 120 may remain in secondary queue 120 until a sufficient number of entries 112 are available to receive a queued store request from secondary queue 120.

Method 600 further continues at block 640 by, in response to determining that the primary queue has an available entry, relocating an oldest store request from the secondary queue to the primary queue. As illustrated and as described above, hierarchal store queue circuit 101 may transfer one or more of entries 122 as entries 112 are freed by committing the store requests. In embodiments in which a primary queue entry identifier is included in entries 122, relocating the oldest store request in secondary queue 120 to primary queue 110 may include determining, by hierarchal store queue circuit 101, whether an entry 112 indicated by the primary queue entry identifier is one of the available entries 112 in primary queue 110. If the oldest store request in secondary queue 120 is destined for a particular one of entries 112, then that entry 112 must be available before the relocation can occur. If entries 112 are committed out of order, then transfer of store requests from secondary queue 120 may stall until the identified one of entries 112 is available.

In some cases, hierarchal store queue circuit 101 may concurrently relocate two or more store requests from secondary queue 120 to primary queue 110 in response to determining that at least two entries 112 are available in primary queue 110. For example, if transfer of store requests from secondary queue 120 stalls as just described, then multiple ones of entries 112 may be available when the identified one of entries 112 becomes available. Accordingly, it may be possible to transfer more than one of the store requests from secondary queue 120 to primary queue 110 concurrently.

As described above, store requests queued in secondary queue 120 may be resolved prior to being relocated to primary queue 110. In such cases, the resolved store request may be given a ready-for-execution status upon placement in the respective one of entries 112. In other cases, however, relocating the oldest store request in secondary queue 120 to primary queue 110 may occur prior to resolving the oldest store request. For example, an appropriate one of entries 112 may become available soon after the oldest store request is placed into secondary queue 120, and before this store request has had a chance to be resolved. In such a case, the oldest store request in secondary queue 120 is transferred into a resolve stage of primary queue 110, such as described above in regards to FIG. 4.

By maintaining a program order across primary and secondary queues in a hierarchal store queue circuit, the secondary queue may be implemented with fewer circuits than the primary queue. Reduced circuitry corresponds to less die area for implementing the secondary queue, resulting in more additional queue entries to be added into a given die area as compared to adding entries to the primary queue.

It is noted that the method of FIG. 6 includes blocks 610-640. Method 600 may end in block 640 or may repeat some or all blocks of the method. For example, method 600 may return to block 610 or 620 to place additional store requests. In some cases, blocks of method 600, or a portion thereof, may be performed concurrently with other blocks of the method. For example, block 610 or 620 may be performed while block 630 and or 640 is being performed.

Figure 7:
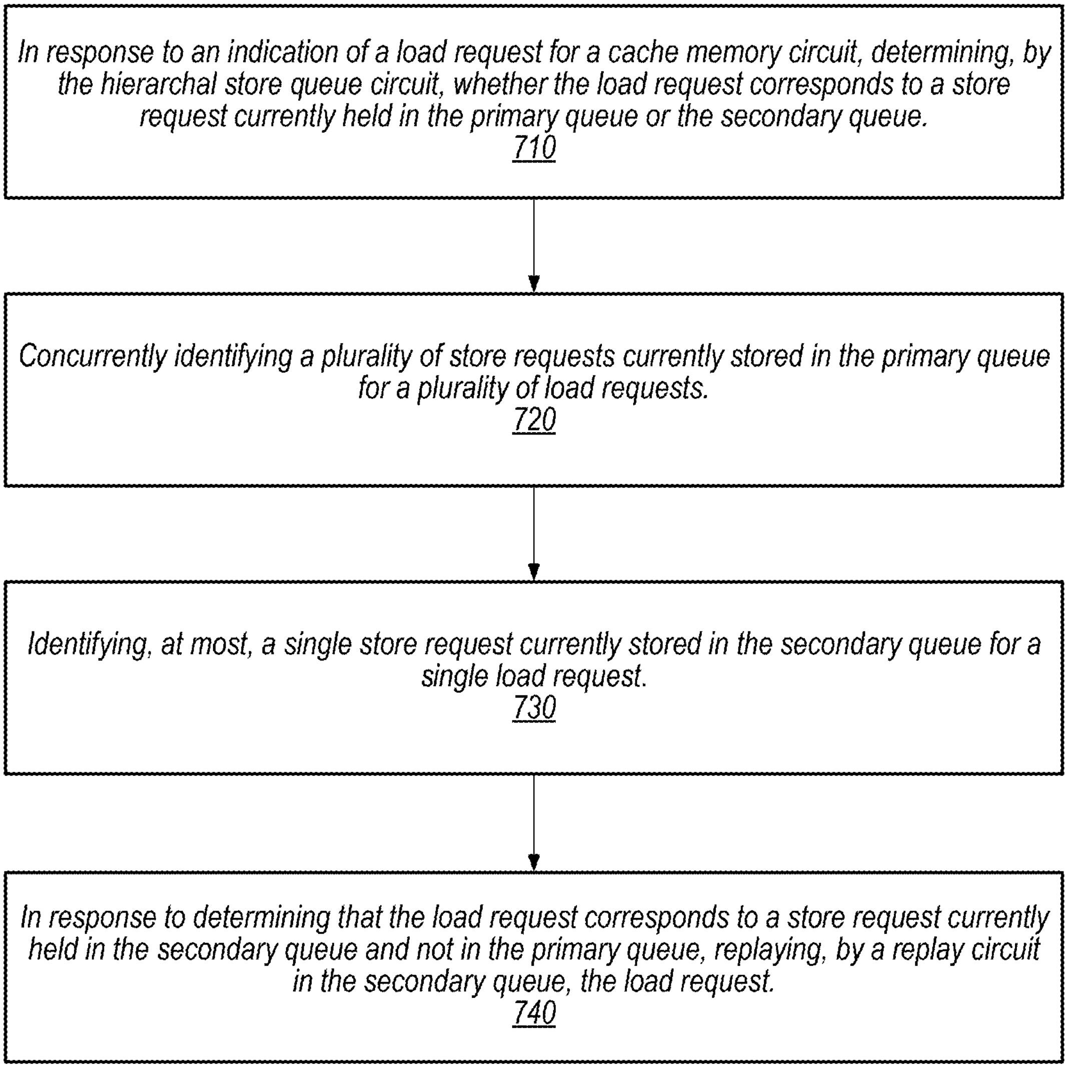
FIG. 7 illustrates a flow diagram of an embodiment of a method for performing a store-to-load forwarding operation in a hierarchal store queue circuit.

Proceeding now to FIG. 7, a flow diagram for an embodiment of a method for performing a store-to-load forwarding operation by a hierarchal store queue circuit is illustrated. Similar to method 600, method 700 may be used in conjunction with any of the computer circuitry, systems, devices, elements, or components disclosed herein, such as systems 100 and 300. Some or all of the operations of method 600, in some embodiments, may be performed using instructions included in a non-transitory, computer-readable storage medium having program, the instructions being executable by a processing circuit in system 100 or 300 to cause the operations described with reference to FIG. 7. Method 700 is described below using FIG. 2 as an example embodiment. References to elements in FIG. 2 are included as non-limiting examples.

As shown, method 700 begins in block 710 with a hierarchal store queue circuit, in response to an indication of a load request for a cache memory circuit, determining whether the load request corresponds to a store request currently held in a primary queue or a secondary queue. For example, hierarchal store queue circuit 101 may determine whether load request 245, intended for cache memory circuit 130 of FIG. 1, corresponds to a store request currently held in hierarchal store queue circuit 101, including, e.g., any one or more of store requests 240 currently held in a combination of primary queue 110 and secondary queue 120. An indication of load request 245 may be sent to hierarchal store queue circuit 101 to determine if any of store requests 240 correspond to the address of load request 245. If so, then a store request in hierarchal store queue circuit 101 may hold a most current value for the address.

At block 720, method 700 continues by concurrently identifying a plurality of store requests currently stored in the primary queue for a plurality of load requests. For example, primary queue 110 includes primary-queue load-pipe circuits 250. To determine whether load request 245 corresponds to one or more of store requests 240*b*-240*d* in primary queue 110, hierarchal store queue circuit 101 may load the address identified in load request 245 in one of load-pipe circuits 250 in order to search primary queue 110 for a matching store request. The other unused ones of load-pipe circuits 250 may be loaded with a respective one of a plurality of other load requests being processed, such that primary queue 110 may be searched concurrently for respective matching store requests.

Method 700 further proceeds at block 730 by identifying, at most, a single store request currently stored in the secondary queue for a single load request. To determine, for example, whether load request 245 corresponds to store requests 240*e* and/or 240*f* in secondary queue 120, hierarchal store queue circuit 101 may identify at most a single store request in secondary queue 120 for the single load request 245. In contrast to primary queue 110, secondary queue 120 includes a single load-pipe circuit 255. Accordingly, hierarchal store queue circuit 101 may use load-pipe circuit 255 to process only load request 245. Other load requests, such as any others being processed in load-pipe circuits 250, may be queued and replayed in load-pipe circuit 255 after a current processing of load request 245 has completed.

At block 740, method 700 continues by, in response to determining that the load request corresponds to a store request currently held in the secondary queue and not in the primary queue, replaying, by a replay circuit in the secondary queue, the load request. For example, if a store request (e.g., store request 240*f*) in secondary queue 120 corresponds to load request 245, then store request 240*f* may be the youngest store request that has been issued for the address of load request 245 and therefore has the most current value for the corresponding memory location. A store-to-load forwarding operation may then be performed using store request 240*f*, by placing load request 245 into a replay circuit of secondary queue 120. Use of the replay buffer may provide time for hierarchal store queue circuit 101 to cease store-to-load forwarding operations in primary queue 110 and allow the most current value from store request 240*f* to be used in the fulfillment of load request 245.

Use of a single load pipe in secondary queue 120 may result in higher latency for completing a store-to-load forwarding operation as compared with the multiple load pipes in primary queue 110. Accordingly, a latency to forward data from primary queue 110 to a load request may be less than a latency to forward data from secondary queue 120 to a load request. This difference, however, may result in larger, more complex load-pipe circuits for primary queue 110 than for secondary queue 120. Older store requests may be more likely to be hit by older load requests, and older load requests may be more urgent to complete than younger ones in order to reduce performance impact to a system. Since primary queue 110 holds older store requests than secondary queue 120, a reduced latency from primary queue 110 may be worth the size and power increases while the longer latency from secondary queue 120 may be acceptable to avoid incurring an increased size and power penalty.

It is noted that method 700 includes blocks 710-740. Method 700 may end in block 740 or may repeat some or all blocks of the method. For example, method 700 may return to block 710 in response to an indication of another load request. In a manner as described above for method 600, method 700 may be performed concurrently with other instantiations of itself and/or method 600. For example, one or more instances of method 600 may be performed to place store requests into primary or secondary queues while an instance of method 700 is performed to perform a store-to-load forwarding operation for one or more load requests.

Figure 8:
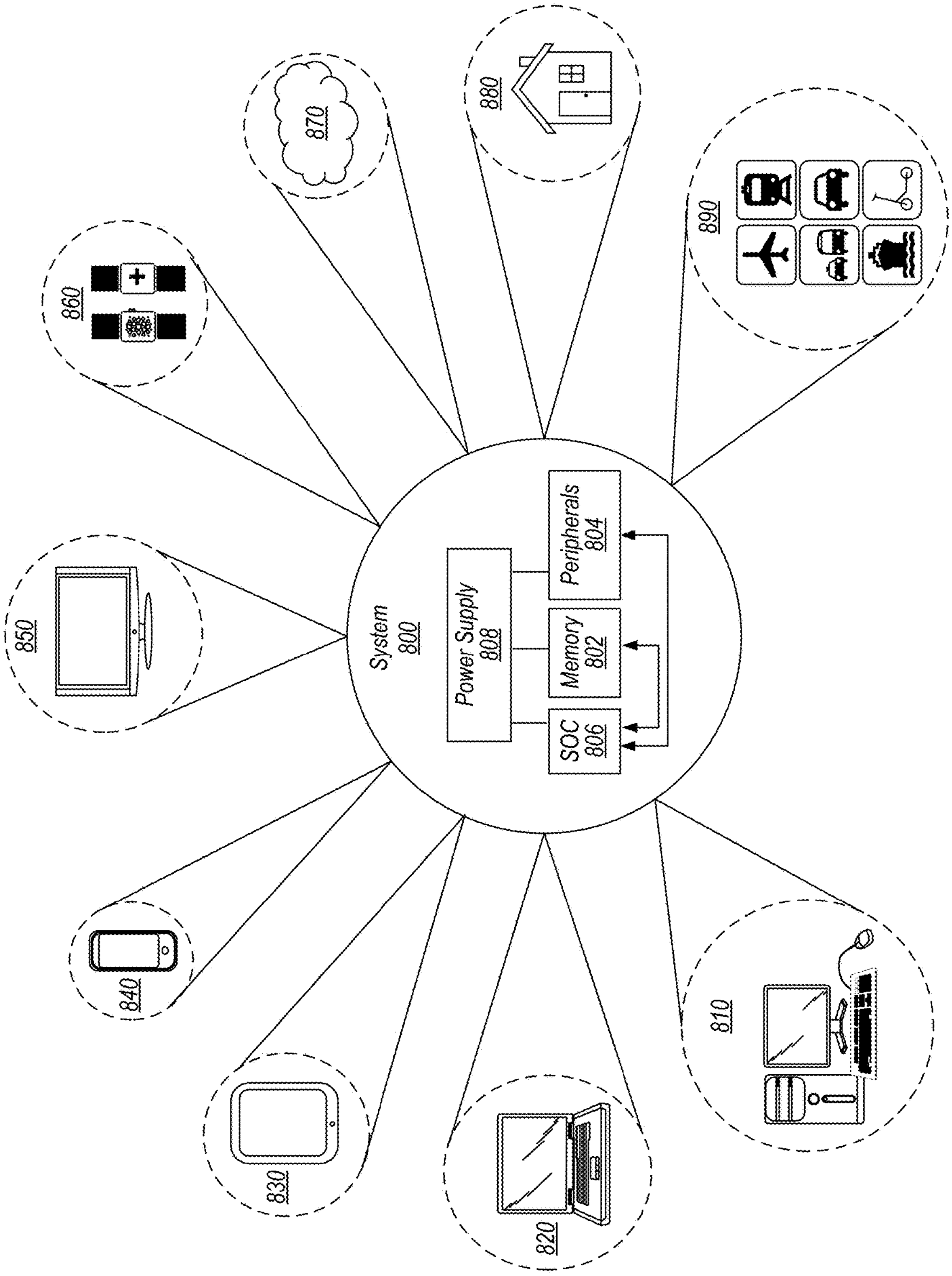
FIG. 8 shows various embodiments of systems that include integrated circuits that utilize the disclosed techniques.

FIGS. 1-7 illustrate circuits and methods for a system, such as an integrated circuit, that includes a hierarchal store queue circuit in the integrated circuit. Any embodiment of the disclosed systems may be included in one or more of a variety of computer systems, such as a desktop computer, laptop computer, smartphone, tablet, wearable device, and the like. In some embodiments, the circuits described above may be implemented on a system-on-chip (SoC) or other type of integrated circuit. A block diagram illustrating an embodiment of computer system 800 is illustrated in FIG. 8. SoC 806 may, in some embodiments, include any disclosed embodiment of systems 100 and 300 in FIGS. 1 and 3.

In the illustrated embodiment, the system 800 includes at least one instance of a system on chip (SoC) 806 which may include multiple types of processor circuits, such as a central processing unit (CPU), a graphics processing unit (GPU), or otherwise, a communication fabric, and interfaces to memories and input/output devices. One or more of these processor circuits may correspond to an instance of the processor cores disclosed herein. In various embodiments, SoC 806 is coupled to external memory circuit 802, peripherals 804, and power supply 808.

A power supply 808 is also provided which supplies the supply voltages to SoC 806 as well as one or more supply voltages to external memory circuit 802 and/or the peripherals 804. In various embodiments, power supply 808 represents a battery (e.g., a rechargeable battery in a smart phone, laptop or tablet computer, or other device). In some embodiments, more than one instance of SoC 806 is included (and more than one external memory circuit 802 is included as well).

External memory circuit 802 is any type of memory, such as dynamic random-access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. In some embodiments, external memory circuit 802 may include non-volatile memory such as flash memory, ferroelectric random-access memory (FRAM), or magnetoresistive RAM (MRAM). One or more memory devices may be coupled onto a circuit board to form memory modules such as single inline memory modules (SIMMs), dual inline memory modules (DIMMs), etc. Alternatively, the devices may be mounted with a SoC or an integrated circuit in a chip-on-chip configuration, a package-on-package configuration, or a multi-chip module configuration.

The peripherals 804 include any desired circuitry, depending on the type of system 800. For example, in one embodiment, peripherals 804 includes devices for various types of wireless communication, such as Wi-Fi, Bluetooth, cellular, global positioning system, etc. In some embodiments, the peripherals 804 also include additional storage, including RAM storage, solid state storage, or disk storage. The peripherals 804 include user interface devices such as a display screen, including touch display screens or multi-touch display screens, keyboard or other input devices, microphones, speakers, etc.

As illustrated, system 800 is shown to have application in a wide range of areas. For example, system 800 may be utilized as part of the chips, circuitry, components, etc., of a desktop computer 810, laptop computer 820, tablet computer 830, cellular or mobile phone 840, or television 850 (or set-top box coupled to a television). Also illustrated is a smartwatch and health monitoring device 860. In some embodiments, the smartwatch may include a variety of general-purpose computing related functions. For example, the smartwatch may provide access to email, cellphone service, a user calendar, and so on. In various embodiments, a health monitoring device may be a dedicated medical device or otherwise include dedicated health related functionality. In various embodiments, the above-mentioned smartwatch may or may not include some or any health monitoring related functions. Other wearable devices 860 are contemplated as well, such as devices worn around the neck, devices attached to hats or other headgear, devices that are implantable in the human body, eyeglasses designed to provide an augmented and/or virtual reality experience, and so on.

System 800 may further be used as part of a cloud-based service(s) 870. For example, the previously mentioned devices, and/or other devices, may access computing resources in the cloud (i.e., remotely located hardware and/or software resources). Still further, system 800 may be utilized in one or more devices of a home 880 other than those previously mentioned. For example, appliances within the home may monitor and detect conditions that warrant attention. Various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 8 is the application of system 800 to various modes of transportation 890. For example, system 800 may be used in the control and/or entertainment systems of aircraft, trains, buses, cars for hire, private automobiles, waterborne vessels from private boats to cruise liners, scooters (for rent or owned), and so on. In various cases, system 800 may be used to provide automated guidance (e.g., self-driving vehicles), general systems control, and otherwise.

It is noted that the wide variety of potential applications for system 800 may include a variety of performance, cost, and power consumption requirements. Accordingly, a scalable solution enabling use of one or more integrated circuits to provide a suitable combination of performance, cost, and power consumption may be beneficial. These and many other embodiments are possible and are contemplated. It is noted that the devices and applications illustrated in FIG. 8 are illustrative only and are not intended to be limiting. Other devices are possible and are contemplated.

As disclosed in regards to FIG. 8, computer system 800 may include one or more integrated circuits included within a personal computer, smart phone, tablet computer, or other type of computing device. A process for designing and producing an integrated circuit using design information is presented below in FIG. 9.

Figure 9:
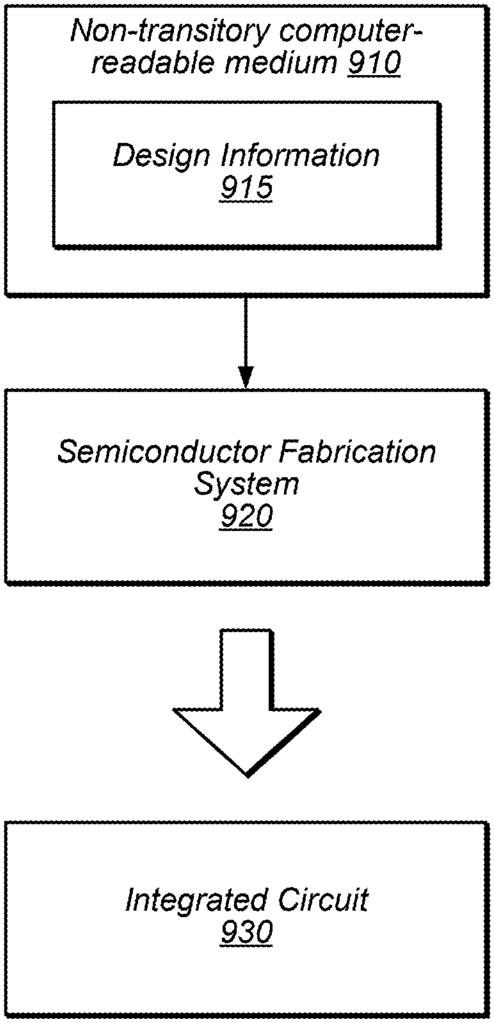
FIG. 9 is a block diagram of an example computer-readable medium, according to some embodiments.

FIG. 9 is a block diagram illustrating an example of a non-transitory computer-readable storage medium that stores circuit design information, according to some embodiments. The embodiment of FIG. 9 may be utilized in a process to design and manufacture hardware integrated circuits, for example, including one or more instances of systems 100 and 300 shown in FIGS. 1 and 3. In the illustrated embodiment, semiconductor fabrication system 920 is configured to process the design information 915 stored on non-transitory computer-readable storage medium 910 and fabricate hardware integrated circuit 930 based on the design information 915.

Non-transitory computer-readable storage medium 910, may comprise any of various appropriate types of memory devices or storage devices. Non-transitory computer-readable storage medium 910 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof. Non-transitory computer-readable storage medium 910 may include two or more memory mediums which may reside in different locations, e.g., in different computer systems that are connected over a network.

Design information 915 may be specified using any of various appropriate computer languages, including hardware description languages such as, without limitation: VHDL, Verilog, SystemC, SystemVerilog, RHDL, M, MyHDL, etc. Design information 915 may be usable by semiconductor fabrication system 920 to fabricate at least a portion of integrated circuit 930. The format of design information 915 may be recognized by at least one semiconductor fabrication system, such as semiconductor fabrication system 920, for example. In some embodiments, design information 915 may include a netlist that specifies elements of a cell library, as well as their connectivity. One or more cell libraries used during logic synthesis of circuits included in integrated circuit 930 may also be included in design information 915. Such cell libraries may include information indicative of device or transistor level netlists, mask design data, characterization data, and the like, of cells included in the cell library.

Integrated circuit 930 may, in various embodiments, include one or more custom macrocells, such as memories, analog or mixed-signal circuits, and the like. In such cases, design information 915 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements shown or described herein. Further, integrated circuit 930 may be configured to perform various functions described herein in conjunction with other components.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:

a memory system; and a hierarchal store queue circuit that includes a primary queue and a secondary queue, wherein the hierarchal store queue circuit is configured to:

receive a plurality of store requests to write information to the memory system;

place a first subset of the plurality of store requests in the primary queue based on the primary queue currently having capacity;

place a second subset of the plurality of store requests in the secondary queue based on the primary queue currently not having capacity;

resolve addresses indicated by ones of the first subset of store requests placed in the primary queue;

initiate a resolve operation for addresses indicated by ones of the second subset of store requests placed in the secondary queue; and based on a determination that the primary queue currently has capacity and the secondary queue currently includes one or more store requests, transfer a given store request from the secondary queue to the primary queue.

2. The apparatus of claim 1, wherein the hierarchal store queue circuit is further configured to:

based on a determination that an initiated address translation has not completed for the transferred store request, complete the initiated address translation prior to a performance of the transferred store request.

3. The apparatus of claim 1, wherein the hierarchal store queue circuit is further configured to:

make store requests that are in the primary queue available for commitment, wherein committing store requests from the primary queue frees space in the primary queue; and prevent store requests that are in the secondary queue from commitment.

4. The apparatus of claim 1, wherein to transfer the given store request, the hierarchal store queue circuit is further configured to select an oldest store request in the secondary queue to transfer to the primary queue.

5. The apparatus of claim 1, wherein the hierarchal store queue circuit is further configured to:

based on an indication of a load request for the memory system, determine whether the load request corresponds to a store request currently held in the hierarchal store queue circuit.

6. The apparatus of claim 5, wherein the hierarchal store queue circuit is further configured to:

concurrently identify a plurality of store requests currently stored in the primary queue for a plurality of load requests; and identify a single store request currently stored in the secondary queue for a single load request.

7. The apparatus of claim 1, wherein the primary queue includes a plurality of memory banks that may be accessed concurrently, and wherein the secondary queue includes a single memory bank.

8. The apparatus of claim 1, wherein the hierarchal store queue circuit is further configured to determine that an oldest store request in the secondary queue has completed the resolve operation prior to transferring the oldest store request to the primary queue.

9. A method comprising:

receiving, by a hierarchal store queue circuit that includes a primary queue and a secondary queue, a plurality of store requests for writing respective values to indicated locations of a memory system;

based on determining that the primary queue has at least one available entry, placing, by the hierarchal store queue circuit, a first subset of the plurality of store requests into the available entries of the primary queue;

based on determining that the primary queue is full, placing, by the hierarchal store queue circuit, a second subset of the plurality of store requests into available entries of the secondary queue;

performing a first resolve operation on a first store request of the first subset of store requests in the primary queue to determine a first destination address in the memory system;

initiating a second resolve operation on a second store request of the second subset of store requests in the secondary queue to determine a second destination address in the memory system; and after the first destination address is determined, executing the first store request.

10. The method of claim 9, further comprising:

after the first store request has completed, clearing an entry in the primary queue that held the first store request; and transferring the second store request from the secondary queue to the primary queue.

11. The method of claim 10, wherein transferring the second store request from the secondary queue to the primary queue includes determining that the second store request is the oldest store request in the secondary queue.

12. The method of claim 10, further comprising:

determining that the second resolve operation on the second store request completed before the transferring; and waiting to execute the second store request until after the transferring to the primary queue is complete.

13. The method of claim 10, further comprising, determining that the second resolve operation on the second store request has not completed before the transferring; and completing the second resolve operation after the transferring to the primary queue is complete.

14. The method of claim 9, wherein performing a given resolve operation for a given store request includes identifying a physical address from a virtual address included in the given store request.

15. A system comprising:

a memory circuit;

a store instruction pipeline circuit that includes a first resolve stage, a second resolve stage, a store execution stage, and a retire stage; and a hierarchal store queue circuit that includes a primary queue and a secondary queue, wherein the hierarchal store queue circuit is configured to:

receive a first store request and a second store request for writing respective values to the memory circuit, wherein the first and second store requests include respective first and second indications that are associated with respective physical addresses in the memory circuit;

place the first store request in a first entry in the primary queue; and based on determining that the primary queue does not have an available entry for holding the second store request, place the second store request in a second entry in the secondary queue;

wherein the store instruction pipeline circuit is configured to:

to determine a first physical address from the first indication, place the first store request into the first resolve stage;

to determine a second physical address from the second indication, place the second store request into the second resolve stage; and after the first physical address is determined, move the first store request into the store execution stage to perform the first store request.

16. The system of claim 15, wherein the store instruction pipeline circuit is further configured to:

after the first store request has been performed, move the first store request to the retire stage; and wherein the hierarchal store queue circuit is further configured to:

after the first store request is retired, mark the first entry in the primary queue as available; and transfer the second store request to the first entry in the primary queue.

17. The system of claim 16, wherein the store instruction pipeline circuit is further configured to:

based on a determination that the second indication completed the second resolve stage, move the second store request into the store execution stage to perform the second store request.

18. The system of claim 16, wherein the store instruction pipeline circuit is further configured to:

based on a determination that the second indication did not complete the second resolve stage, move the second store request into the first resolve stage to complete the determination of the second physical address; and after the second physical address is determined, move the second store request into the store execution stage to perform the second store request.

19. The system of claim 18, wherein to move the second store request into the first resolve stage, the store instruction pipeline circuit is further configured to:

based on a determination that resources for the first resolve stage are not currently available, hold the second store request in the second resolve stage; and based on a determination that resources for the first resolve stage are available, move the second store request into the first resolve stage.

20. The system of claim 16, wherein to transfer the second store request to the first entry in the primary queue, the hierarchal store queue circuit is configured to determine that the second store request is the oldest store request currently in the secondary queue.

* * * * *